United States Patent [19]
Marshall et al.

[11] Patent Number: 5,729,621
[45] Date of Patent: Mar. 17, 1998

[54] METHOD AND APPARATUS FOR MAGNETIC INK CHARACTER RECOGNITION USING A MAGNETO-RESISTIVE READ HEAD

[75] Inventors: Gary R. Marshall; Gene R. Franklin; Benedict C-M Ho, all of Waterloo, Canada

[73] Assignee: NCR Corporation, Dayton, Ohio

[21] Appl. No.: 522,444

[22] Filed: Aug. 31, 1995

[51] Int. Cl.⁶ ............................ G06K 7/08; G06K 9/20
[52] U.S. Cl. ...................... 382/139; 382/194; 382/320
[58] Field of Search .............................. 382/137, 138, 382/139, 182, 183, 194, 174, 207, 200, 199, 320; 235/449

[56] References Cited

U.S. PATENT DOCUMENTS

| | | | |
|---|---|---|---|
| 3,212,058 | 10/1965 | Sanner | 382/139 |
| 3,278,900 | 10/1966 | Wood | 382/139 |
| 4,143,356 | 3/1979 | Nally | 382/139 |
| 4,475,238 | 10/1984 | Everhart | 382/218 |
| 4,668,913 | 5/1987 | Vinal | 324/235 |
| 5,091,961 | 2/1992 | Baus, Jr. | 382/139 |
| 5,091,968 | 2/1992 | Higgins et al. | 382/137 |
| 5,151,952 | 9/1992 | Canu et al. | 382/207 |
| 5,266,786 | 11/1993 | Mazumder | 235/449 |
| 5,524,063 | 6/1996 | Henrot | 382/139 |

Primary Examiner—Joseph Mancuso
Assistant Examiner—Jon Chang
Attorney, Agent, or Firm—Michael A. Kaufman

[57] ABSTRACT

A signal extraction and character recognition system is provided for an MICR system using E13B font characters and a magneto-resistive read head. Each character is treated as defining a block comprising a matrix of equal sized zones. Because adjacent characters are separated by space (e.g., non-residually magnetized regions), the read head output signal is used to first identify the start of each character. As the document bearing the characters moves relative to the head, the signal strength from each vertical zone is summed. The relative vertical column signal strength is then compared to the vertical column signal strength for the preceding column to form a ratio set. The ratios are then quantized into one of three levels, depending upon whether $R>T_1$ (a first threshold, preferably 4/3), $R<T_2$ (a second threshold, preferably 3/4), $T_2 \leq R \leq T_1$. The patterns of these three quantized levels uniquely identify the 14 characters in the E13B character set. These patterns from the processed output signal from the magneto-resistive head are compared with the contents of a look-up table (or the equivalent) containing patterns for the 14 characters in the E13B font to identify the character being read.

20 Claims, 16 Drawing Sheets

0 0 0 6 9 4 4 0 0

0  0  3  3  3  9  4.5  0  0

0 0 7 7 1 1 4 4 0

0  0  6  3  3  3  6  0  0

0 0 9 3 3 4.5 2 4 0

0   4.5   9   3   3   3   9   4.5   0

0 0 5 2 2 2 6 9 0

0  4  4  0  5  0  4  4  0

0   6   0   6   0   4   4   4   0

0   6   6   0   0   6   6   6   0

0  4  4  0  4  4  0  4  0

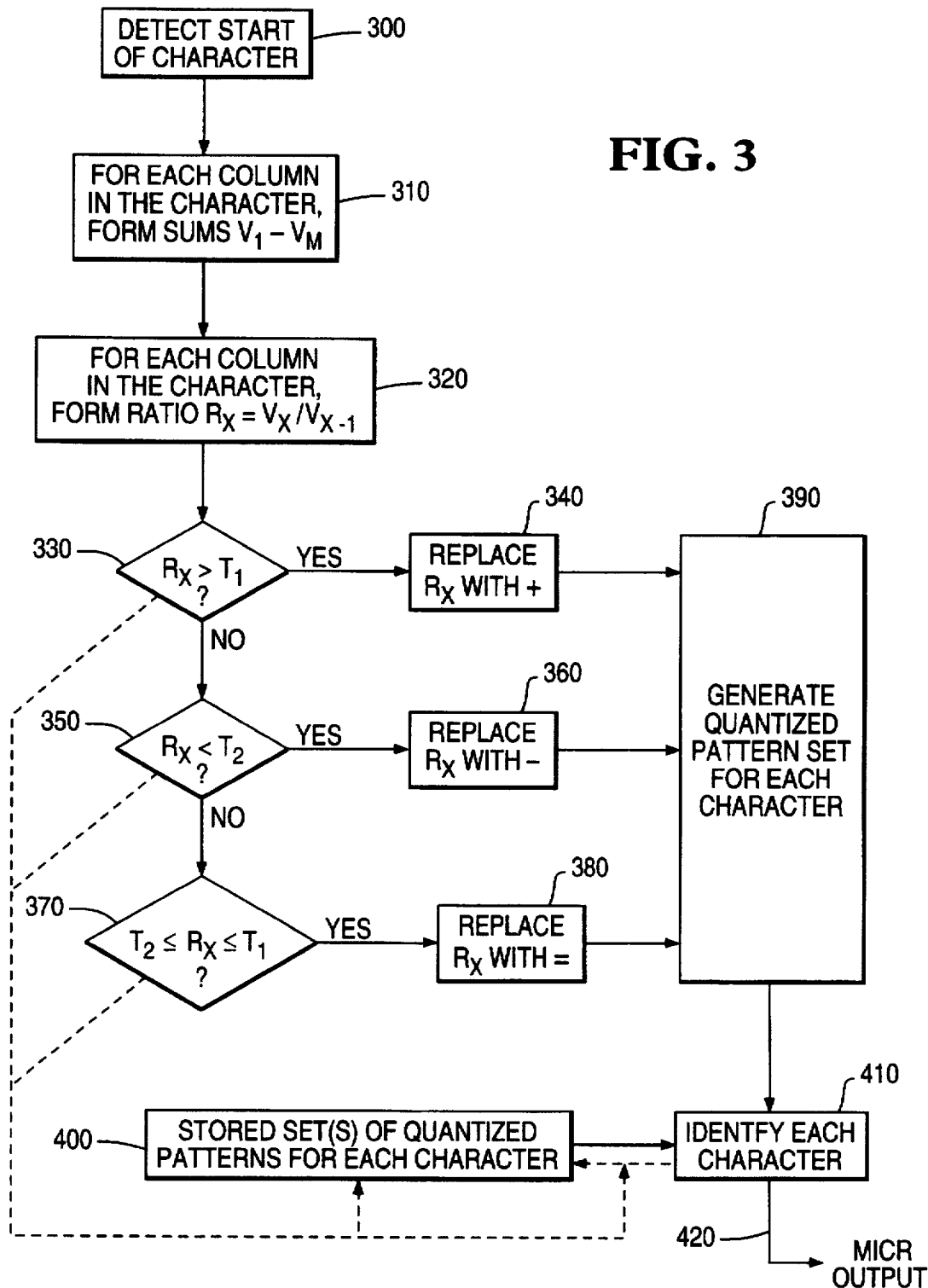

METHOD AND APPARATUS FOR MAGNETIC INK CHARACTER RECOGNITION USING A MAGNETO-RESISTIVE READ HEAD

FIELD OF THE INVENTION

The present invention relates generally to magnetic ink character recognition ("MICR"), and more specifically to methods and apparatuses for recognizing such characters using a magneto-resistive read head.

BACKGROUND OF THE INVENTION

It is known to print characters on documents using magnetic ink to facilitate machine recognition of the characters. Ordinary checks, for example, bear characters printed in magnetic ink that identify the bank and bank account number from which funds are to be paid, to identify the check number and the dollar amount to be paid. The characters are printed using one of several widely accepted fonts such as the so-called CMC-7 font, or the so-called E13B font.

The E13B font, for example, is set forth in the American National Standard specification ANSI X9.27 (1988). The E13B font defines a character set including the digits "0" through "9", as well as symbols for "Amount", "On Us", "Transit" and "Dash". The font characters have a height of about 0.117" (2.79 mm), and a width ranging from 0.052" (1.32 mm) for the digit "1" to 0.091" (2.312 mm) for the digit "0". The distance between the right average edge of adjacent characters is specified to be about 0.125" (3.17 mm). Magnetic ink character recognition systems for reading such magnetically inked characters are known in the art. To read or recognize the characters, the document containing the characters is first subjected to a pre-charge magnetic field. This is accomplished by moving the document past a magnetic field, which produces a residual magnetic charge in the magnetic ink with which the characters were printed. Documents containing the now magnetized ink characters are then moved past or placed near a read head that senses the field pattern of the residual magnetic charge impressed upon the characters. The output signal from the read head is then signal processed to determine which character (e.g., a "0", a "1", etc.) was represented by each sensed magnetic field pattern.

U.S. Pat. No. 3,391,387 to Flores (1968) discloses MICR using an inductive read head. An inductive read head senses the flux rate of change of the magnetic field pattern produced by the magnetically inked characters as they pass near the read head. One disadvantage of MICR systems using inductive read heads is that the documents to be read typically must be moved at a relatively high document speed to produce a recognizable signal pattern, for example about 45 inches/second (114.3 cm/second), or more. Inductive read heads must be spaced relatively closely to the characters to be read, e.g., perhaps 0.0015 inch (0.038 mm), which results in frictional wear upon the somewhat bulky head. Despite these limitations, inductive read head MICR systems can provide high read sensitivity even for characters bearing relatively low magnetic field strength, for example about 0.06 Gauss.

By contrast, U.S. Pat. NO. 5,266,786 to Mazumder (1993) discloses an MICR system using a magneto-resistive read head. Whereas inductive read heads are bulky, expensive to manufacture, and respond only to change in magnetic flux, magneto-resistive read heads are relatively smaller, less expensive to manufacture, and respond to the magnetic flux itself. By analogy, inductive read heads function as A-C coupled devices, whereas magneto-resistive heads function as D-C coupled devices. Thus, MICR systems using magneto-resistive heads can recognize characters at document speeds ranging from zero to perhaps 1,000 inches/second (25.4 m/second). Further, magneto-resistive read heads can be spaced-apart a relatively large distance from the document to be read, perhaps about 0.008 inch (0.2 mm). This relatively large distances minimizes wear and tear not only to the read head but also to the check or other document being read.

Although offering many advantages, magneto-resistive read heads unfortunately provide considerable variation (e.g., a few hundred percent) in the magnitude and shape of their output signal. Further, magneto-resistive read heads do not output a reliable DC threshold reference level. The source of these variations is not well understood, but may be due to so-called fringe effects associated with the beginning and end of each read character. Simply stated, one cannot rely upon the absolute amplitude or absolute waveshape from a magneto-resistive read head for character recognition. Further, the variations in output signal characteristics generally preclude character recognition by differentiating the read head output signal to approximate or simulate a conventional inductive read head.

During signal processing, signal information from the read head is first extracted, normalized, and then subjected to a so-called template matching algorithm process to identify each character being read. But the large variation in output signal provided by magneto-resistive heads can complicate the normalization process, and also dictates that a larger template matching algorithm be used for character recognition. Such larger algorithms require more processing time to achieve recognition, in addition to requiring more memory space within the signal processing system for their storage.

What is needed is a signal processing system that extracts information and provides character recognition for magnetically-inked characters that are sensed with a magneto-resistive head. Preferably such recognition should be provided for E13B font characters, and should be achieved rapidly, without the need for a large template matching algorithm.

The present invention discloses such a signal recognition system.

SUMMARY OF THE INVENTION

The present invention examines each detected magnetically inked and magnetized character as though it were defined within a window block. Each window block comprises a matrix of cells defined by M vertical columns and N horizontal rows. In the E13B font, adjacent characters are separated by a spaced time zone, e.g., a region of no ink, and thus a region without residual magnetism. These spaced time zones permit the start of each character to be recognized by the onset of a relative increase in output signal from the magneto-resistive head.

As the document bearing the characters moves relative to the read head, the signal strength from each vertical column is summed (or read), to form a column set of summed signal strengths, $V_1, V_2, \ldots V_M$. Assume, for example, that the number of columns is M=7, the number of rows is N=9, and that a hypothetical character defined by a cell-wide vertical bar at the start of a window block is to be read. As the document bearing this character moves relative to the read head, the character ideally would be represented by the column set: nine, zero, zero, zero, zero, zero, zero. On the other hand, for a hypothetical character defined by a seven-zone long, cell-wide horizontal bar, the column set would ideally be one, one, one, one, one, one, one.

For the M entries within the column set for each character, the present invention provides signal strength normalization by comparing signal strength from one column ($V_x$) to the signal strength of the preceding column ($V_{x-1}$). A set of ratios $R_x$ is then formed, where $R_x = V_x/V_{x-1}$, and $1 \leq x \leq M$. Because there is empty space (e.g., no magnetic ink and thus no magnetic field) before and after each character, $V_0$ and $V_{M+1}$ will each ideally be zero. As such, V1 will be the first read non-zero signal strength signal encountered. Due to the so-called fringe effect, signal variations will depend upon the separation distance to the adjacent characters, and upon the strength and type of the adjacent characters.

The set of column signal ratios $R_x$ is then quantized into one of three values, depending upon whether $R_x > T_1$ (a first threshold level, preferably 4/3), whether $R_x < T_2$ (a second threshold level, preferably 3/4), or whether $T_2 \leq R_x \leq T_1$. Using three arbitrary quantization symbols $S_1$, $S_2$, $S_3$, which for mnemonic sake may be "+", "−" and "=" respectively, if $R_x > 4/3$ then $R_x$ is set to "+", if $R_x < 3/4$ then $R_x$ is set to "−" and if $3/4 \leq R_x \leq 4/3$ then $R_x$ is set to "=". Thus, for each character read, a quantized code pattern is generated comprising M members that form a unique combination of the "+", "−" and "=" symbols.

Applicants have discovered that quantizing the column signal ratios into these three groups permits patterns of the quantization symbols (+, −, =) to uniquely identify the 14 characters in the E13B character set. The thus-signal processed output signal from the magneto-resistive head is then compared with the contents of a look-up table (or the equivalent) containing patterns for the 14 characters in the E13B font. In this fashion, each character being sensed by the magneto-resistive read head is readily and rapidly identified, without need for a large template algorithm.

Other features and advantages of the invention will appear from the following description in which the preferred embodiments have been set forth in detail in conjunction with the accompanying drawings.

BRIEF DESCRIPTION OF THE DRAWINGS

FIGS. 2AA and 2BB respectively depict the character symbol "Dash" in the E13B font, superimposed upon cells and showing the idealized corresponding column-sum set, and a corresponding typical magneto-resistive read head output signal;

FIG. 3 is a flowchart showing generation and quantization of column-sum sets, and character recognition, according to the present invention.

DETAILED DESCRIPTION OF THE PREFERRED EMBODIMENTS

Figure 1:
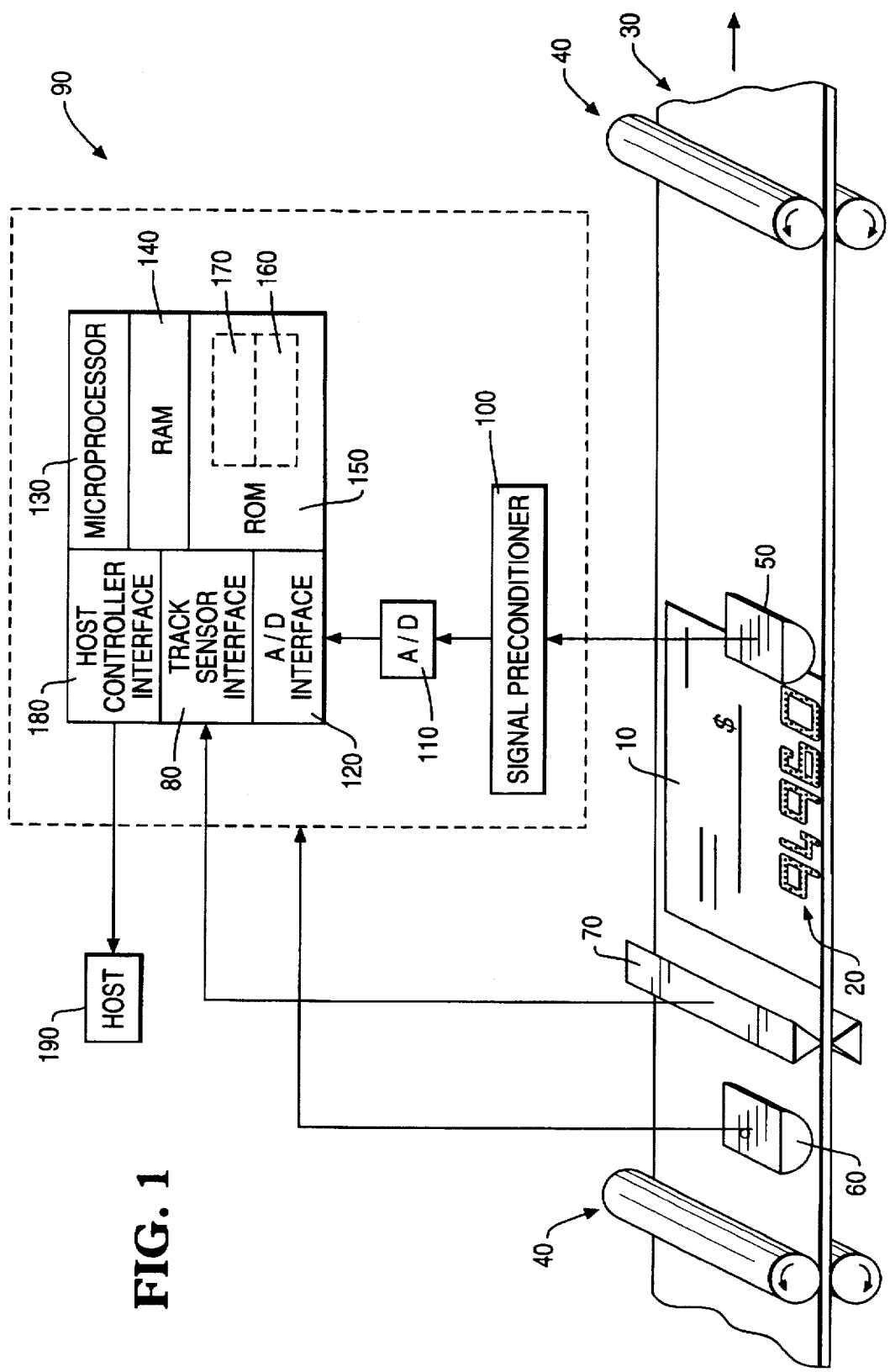
FIG. 1 depicts a system for recognizing magnetically inked characters, according to the present invention.

FIG. 1 depicts a generic MICR system with which the present invention may be practiced. A document 10 bearing one or more magnetically inked characters 20 is placed on a conveyor-like mechanism 30 that is moved by rollers 40 for character sensing by a magneto-resistive read head 50. Document 10 is shown bearing five characters "94960", preferably inked in the E13B MICR font. (For ease of understanding, these characters are depicted in a relatively large size.) In the example shown in FIG. 1, the direction of movement of document 10 is from left-to-right. Thus, read-head 50 will first pass over and sense the character "0", then the "6", the "9", the "4" and finally the leftmost "9". Indeed, within each character, the read head will pass over and sense column data in a right-to-left fashion. For ease of illustration, only a single document is shown, but it is understood that in practice, mechanism 30 will convey a plurality of documents for character reading by read head 50.

As noted, because read head 50 is a magneto-resistive device, document 10 may move with a speed relative to the read head ranging from zero to perhaps 1,000 inches/second (25.4m/second). Further, the spaced-apart distance between document 10 and the magneto-resistive head 50 may be relatively large, e.g., about 0.008 inch (0.2 mm), which prolongs read head lifetime and document life.

In the preferred embodiment, magneto-resistive read head 50 was a so-called single-slot read head and contained two narrow sensing elements that had an active height of about 0.6" (15.2 mm), an active width of about 0.0017" (0.043 mm), with a spaced-apart distance of about 0.0007" (0.018 mm) between the elements. As such, read head 50 outputs a signal level that is relative to the strength of the magnetic field present along the narrow sensing elements. An increase in magnetic field strength and/or an increase in the number of magnetic fields acting upon the elements results in a larger signal output level. U.S. Pat. No. 5,266,786 to Mazumder describes such a single-slot read head.

Before being read, mechanism 30 first conveys the magnetically inked characters 20 to a pre-charge head 60. Precharge head 60 emanates a magnetic field that produces a residual magnetic charge within each magnetically inked character, which charge is detected by read head 50. As document 10 is moved further rightward, a track sensor mechanism 70 senses arrival of the document. Track sensor mechanism 70 then signals the arrival of the document to a track sensor interface circuit 80 within a signal processing system 90. Because the horizontal speed of mechanism 30 is known, the track sensor signal is used to initiate data gathering from the read head 50 and signal processing. The residual magnetic field carried by the magnetically-charged characters 20 is then read, character-by-character, by the magneto-resistive read head 50.

Read head 50 outputs an analog signal to system 90, which signal is first preconditioned by filtering, amplifying and level-shifting by circuitry 100. Preconditioner unit 100 typically includes a notch filter to reject ambient 60/60 Hz noise, and a bandpass filter passing frequencies between about 120 Hz to about 14 KHz for a document speed of 100 inches/second (254 cm/second). The bandpass filter upper frequency limit is dependent upon the speed of the characters as they move relative to the read head, and will increase with relative document-read head speed. Amplification within unit 100 provides a voltage gain of a few thousand or so, to raise the analog signal level to about 5 V peak-to-peak. A level shifter within unit 100 ensures that only a positive signal is output by signal preconditioner 100, and ensures that the dynamic range of the output signal falls within a desired range, e.g., 0 to +5 VDC.

The thus preconditioned read head signal is then digitized by an analog-to-digital converter 110, whose output is coupled to an analog/digital interface circuit 120 within system 90. In the preferred embodiment, analog-to-digital converter 110 is a ten-bit converter that provides digitized output samples for approximately each 0.001" (0.0254 mm) of horizontal displacement of document 10. The digital samples are then stored in random access memory ("RAM") 140, which in the preferred embodiment stores 24 Kb. For a document (or documents) 10 representing approximately 12" (30.48 cm) of horizontal length, approximately 12,000 digital samples are taken and stored in RAM 140. Once the RAM-stored information has been used (as described later herein), the RAM may be overwritten by new incoming data.

System 90 operates under control of a microprocessor 130 that is coupled to RAM 140 and to read-only memory ("ROM") 150. Software 160 embodying the methodology of the present invention may be stored in ROM 150, or may be read into system 90 from an external source, e.g., a computer diskette. Preferably ROM 150 includes a look-up table 170 (or the equivalent), for use by the present invention. As will be described, look-up table 170 contains patterns of the three quantized symbols that represent each of the characters 20 to be sensed and identified.

Microprocessor 130 is also coupled to a host controller interface 180 that couples processed information identifying each recognized character 20 to a host system 190. Host system 190 may use the recognized character information in a variety of ways, for example, to learn what check numbers were written against what bank account number. Of course, the present invention may be practiced with MICR systems unrelated to the banking industry.

Figure 2A:
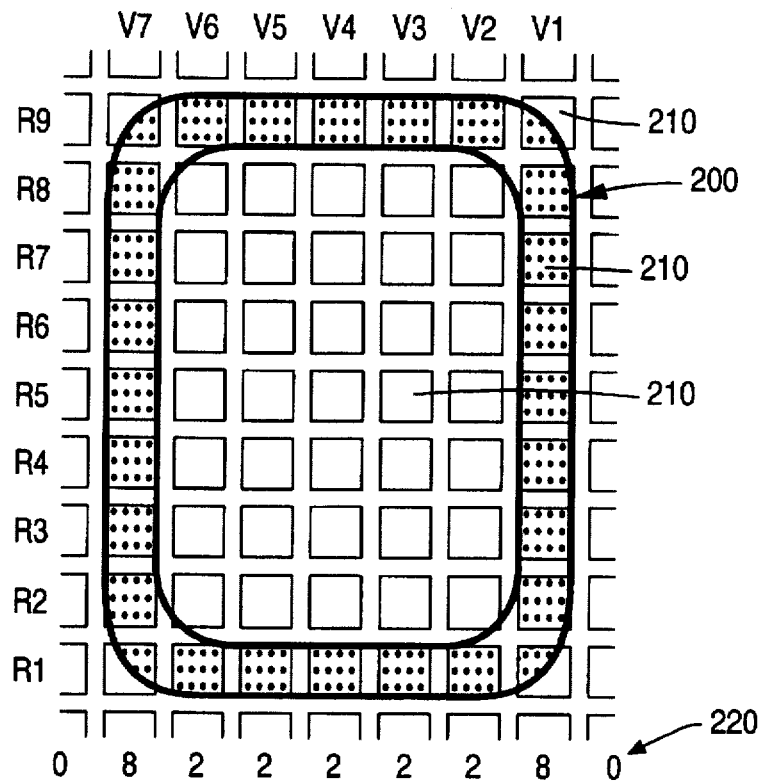
FIGS. 2A and 2B respectively depict the character "0" in the E13B font superimposed upon cells and showing the idealized corresponding column-sum set, and a corresponding typical magneto-resistive read head output signal.

FIG. 2A depicts a character 200, namely a "zero", in the E13B font. According to the present invention, each character is considered to be formed within a window block, and defines a matrix of "cells" 210 formed by the intersection of M columns ($V_1$ through (VM) and N rows ($R_1$ through $R_N$). In the preferred embodiment, M=7 and N=9, although other values of M and N could be used to provide different resolution granularities.

In FIG. 2A (as indeed in the other figures showing characters or character symbols), the portions of the inked character overlying individual cells are shown in crosshatch, so that the "counting" of the underlying cells may more easily be understood. Ideally, of course, the characters shown in the figures in outline would be solidly inked. In practice, however, imperfections in the inking process, or in the document paper itself can result in voids within the ink-printed characters.

Figure 2B:
Figure 2C:
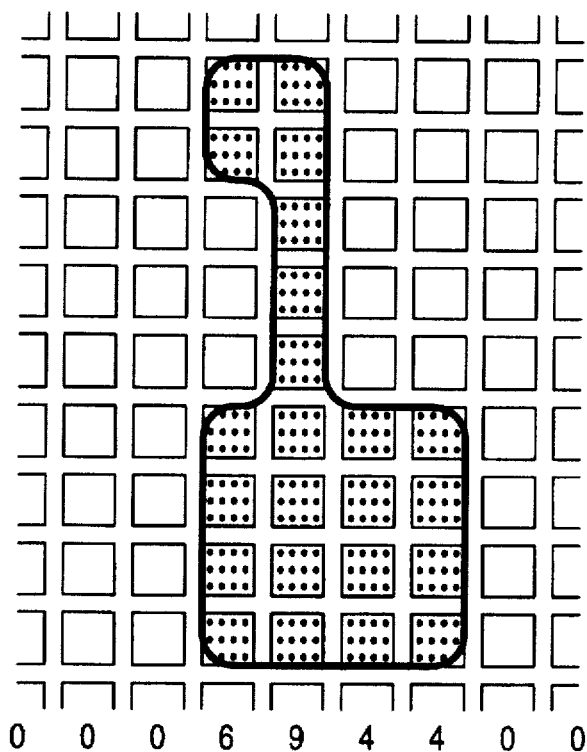
FIGS. 2C and 2D respectively depict the character "1" in the E13B font, superimposed upon cells and showing the idealized corresponding column-sum set, and a corresponding typical magneto-resistive read head output signal.

A character in the E13B font may occupy from four columns or cell-widths, e.g., the character "1" shown in FIG. 2C, to seven columns or cell-widths, e.g. the symbol "0" shown in FIG. 2A. The horizontal width of each individual cell is approximately 0.013" (0.33 mm). As defined by the E13B font standard, a gap or magnetically uninked region precedes and follows each character. Taking into account this requisite empty space preceding and following each character, the "pitch" or separation between the start of adjacent characters is 0.125" (3.175 mm), or about 9.6 cells.

According to the present invention, the signal strength from each of the M vertical columns comprising each character is first measured from the read head output signal. Since the magneto-resistive read head senses the magnitude of the magnetic flux, the columnar signal strength will be proportional to the amount of ink present in the column.

The numbers (collectively, 220) shown under each column in FIG. 2A depict the idealized columnar signal strengths. It is seen that the first-read column ($V_1$) has, ideally, eight "units" of magnetic flux, or ink. By contrast, the second column ($V_2$) has only two "units" of magnetic flux, namely at the very top and the very bottom of the character. Similarly, columns $V_3$ through $V_6$ also have only two "units" of magnetic flux each, whereas the last-read (e.g., leftmost) column $V_7$ has eight "units" of magnetic flux. Thus, reading right-to-left, the numerals 8-2-2-2-2-2-8 beneath FIG. 2A represent these idealized column signal strengths. A "0" strength level precedes the right-most "8" due to the last portion of the uninked gap that precedes the reading of the rightmost portion of the "zero" character 200. As such, the first non-zero strength signal encountered is denoted V1, wherein V0 is defined as having zero signal strength (as it represents an uninked region).

In practice, however, the analog output signal from the read head will not necessary reflect the idealized absolute signal strengths, and in fact may vary considerably from one read head to another. FIG. 2B depicts a typical analog output signal 230 corresponding to the character "zero" shown in FIG. 2A.

To facilitate understanding the relationship between the columnar signal strengths and the corresponding analog output waveform signals, the analog output waveform signals (e.g., FIGS. 2B, 2D, 2F, etc.) are shown reversed, right-to-left. This reversal is made because the columnar signal strengths are generated right-to-left, whereas the oscilloscope analog output signals are captured left-to-right. In FIG. 2B (as in the other analog output waveform figures shown), the document speed was about 15 inches/second (38.1 cm/second), each horizontal division represents 1 ms time, and each vertical division represents 200 mV signal intensity amplitude. It is analog signal 230 that magneto-resistive read head 50 outputs into the signal preconditioner 100.

Figure 2D:
Figure 2E:
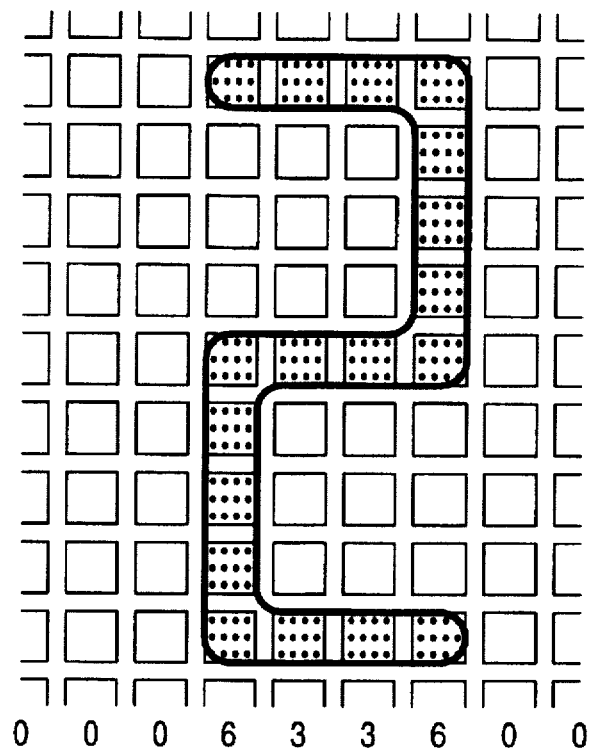
FIGS. 2E and 2F respectively depict the character "2" in the E13B font, superimposed upon cells and showing the idealized corresponding column-sum set, and a corresponding typical magneto-resistive read head output signal.
Figure 2F:
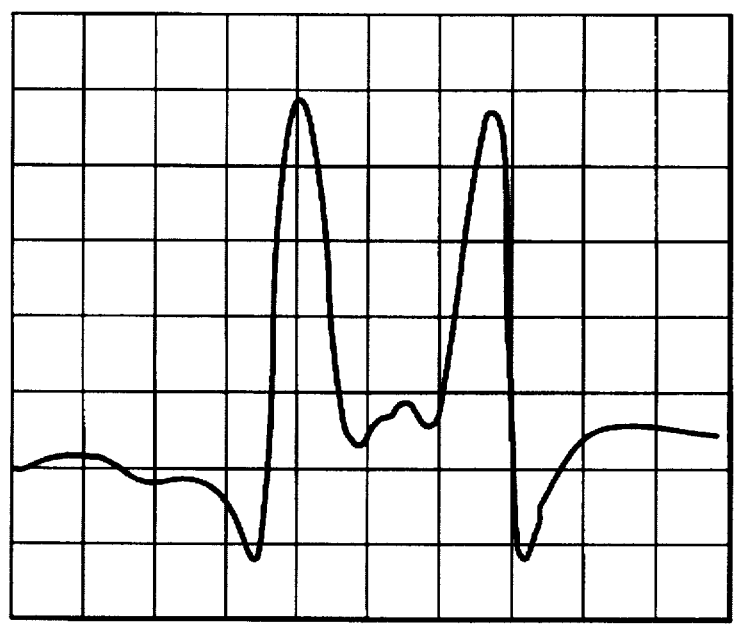
Figure 2G:
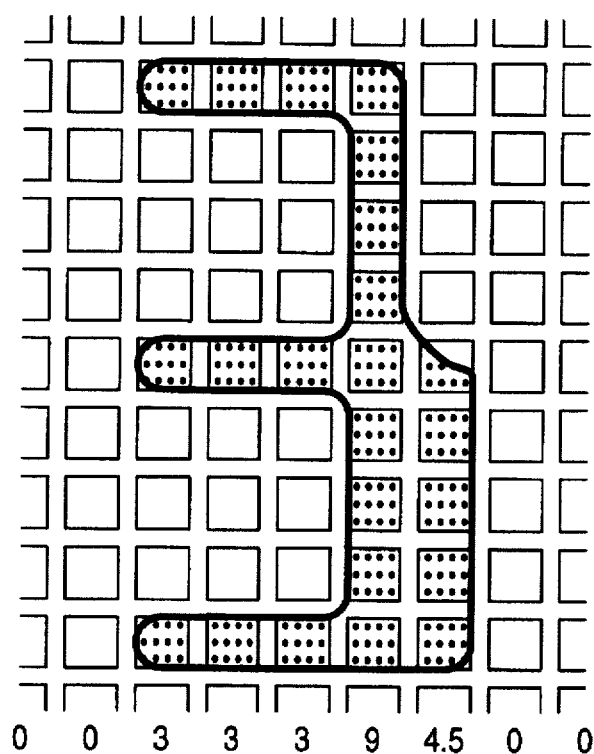
FIGS. 2G and 2H respectively depict the character "3" in the E13B font, superimposed upon cells and showing the idealized corresponding column-sum set, and a corresponding typical magneto-resistive read head output signal.
Figure 2H:
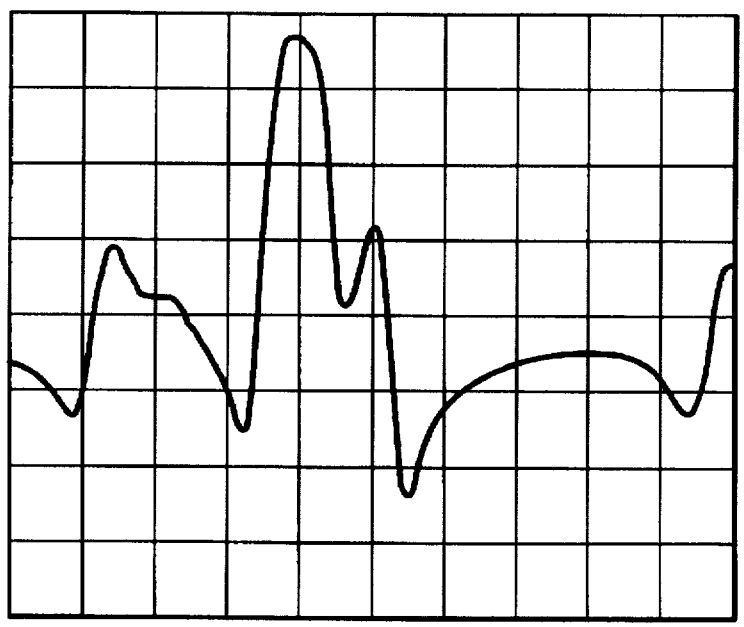
Figure 2I:
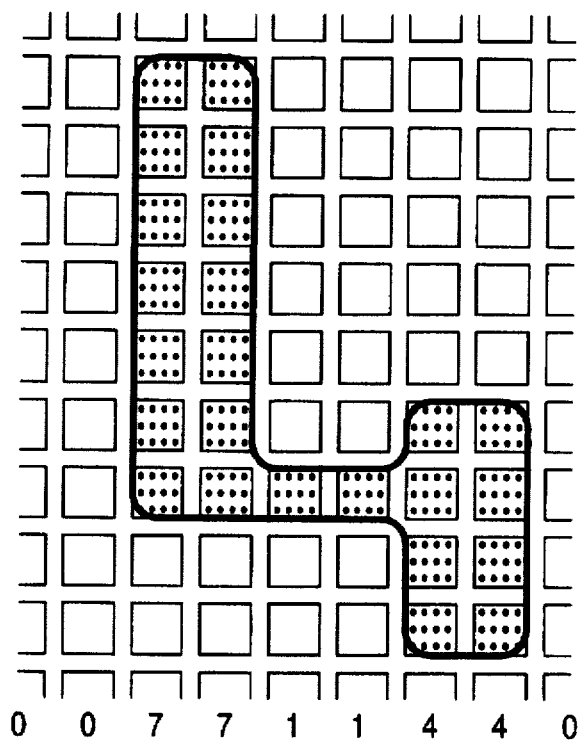
FIGS. 2I and 2J respectively depict the character "4" in the E13B font, superimposed upon cells and showing the idealized corresponding column-sum set, and a corresponding typical magneto-resistive read head output signal.
Figure 2J:
Figure 2K:
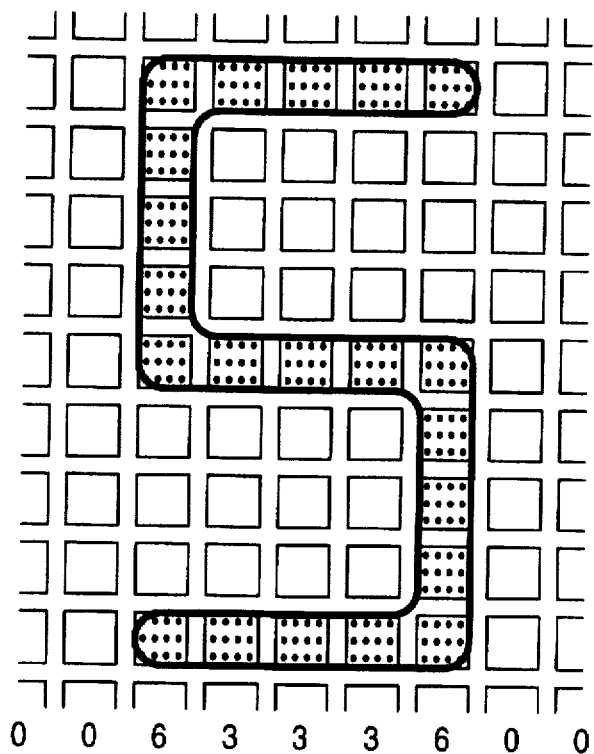
FIGS. 2K and 2L respectively depict the character "5" in the E13B font, superimposed upon cells and showing the idealized corresponding column-sum set, and a corresponding typical magneto-resistive read head output signal.
Figure 2L:
Figure 2M:
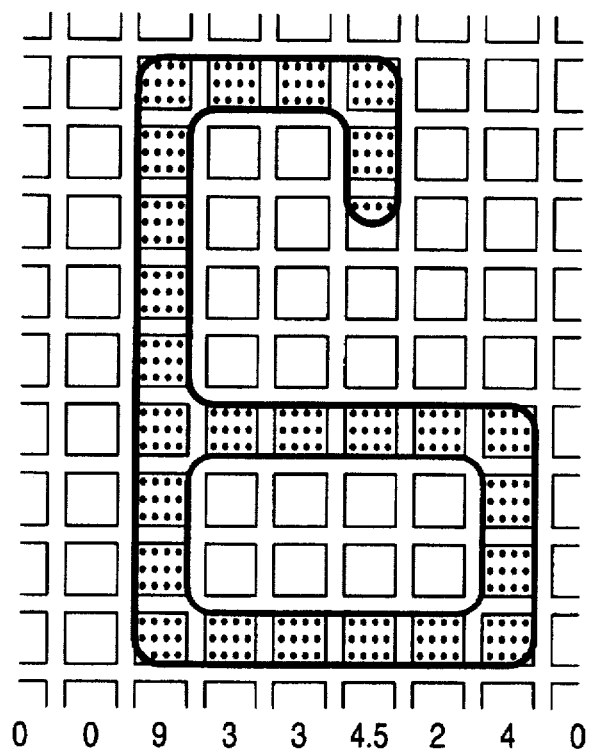
FIGS. 2M and 2N respectively depict the character "6" in the E13B font, superimposed upon cells and showing the idealized corresponding column-sum set, and a corresponding typical magneto-resistive read head output signal.
Figure 2N:
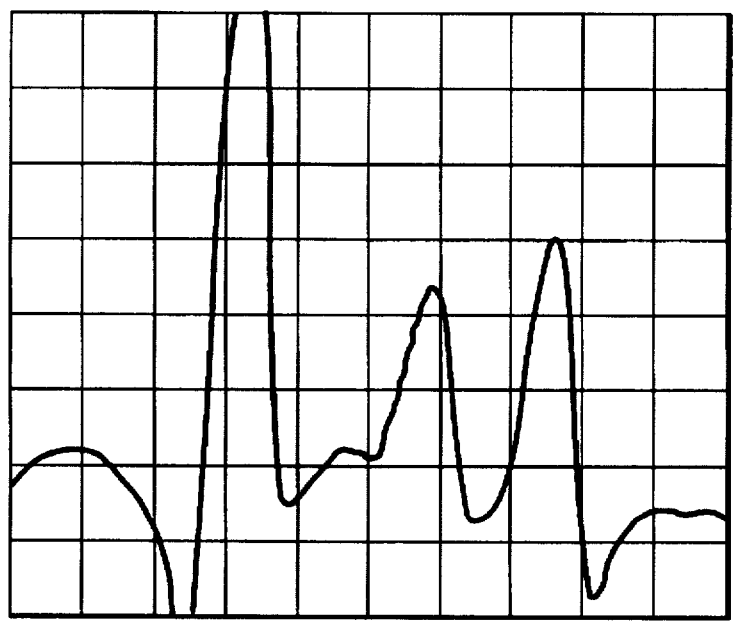
Figure 2O:
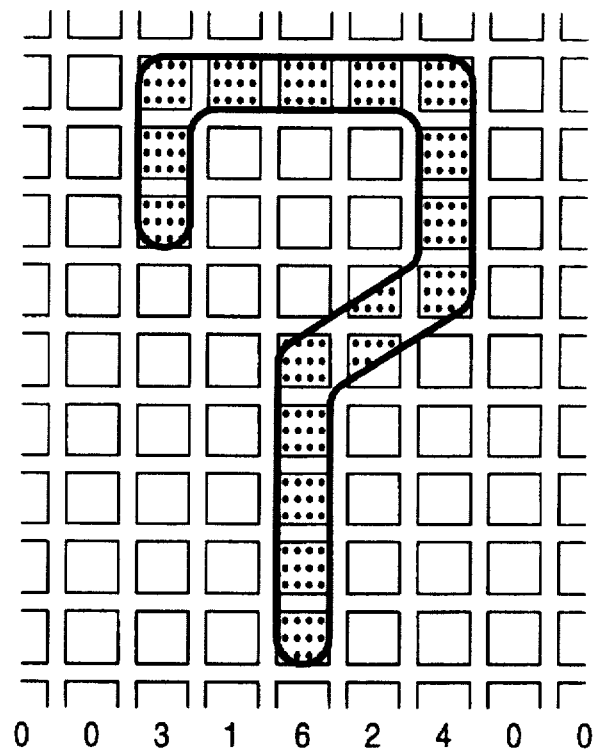
FIGS. 2O and 2P respectively depict the character "7" in the E13B font, superimposed upon cells and showing the idealized corresponding column-sum set, and a corresponding typical magneto-resistive read head output signal.
Figure 2P:
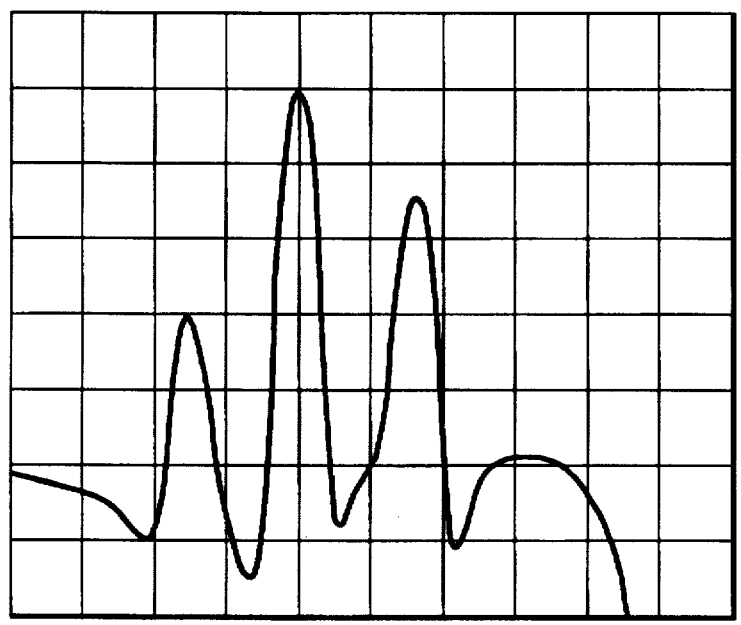
Figure 2Q:
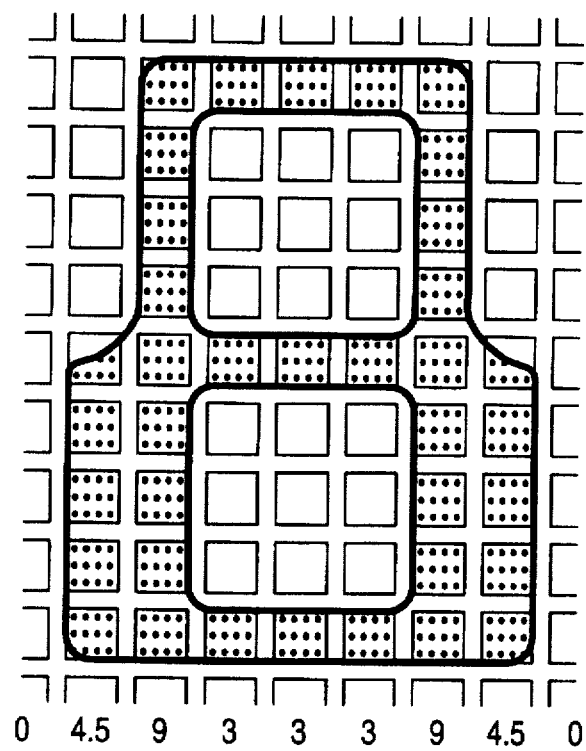
FIGS. 2Q and 2R respectively depict the character "8" in the E13B font, superimposed upon cells and showing the idealized corresponding column-sum set, and a corresponding typical magneto-resistive read head output signal.
Figure 2R:
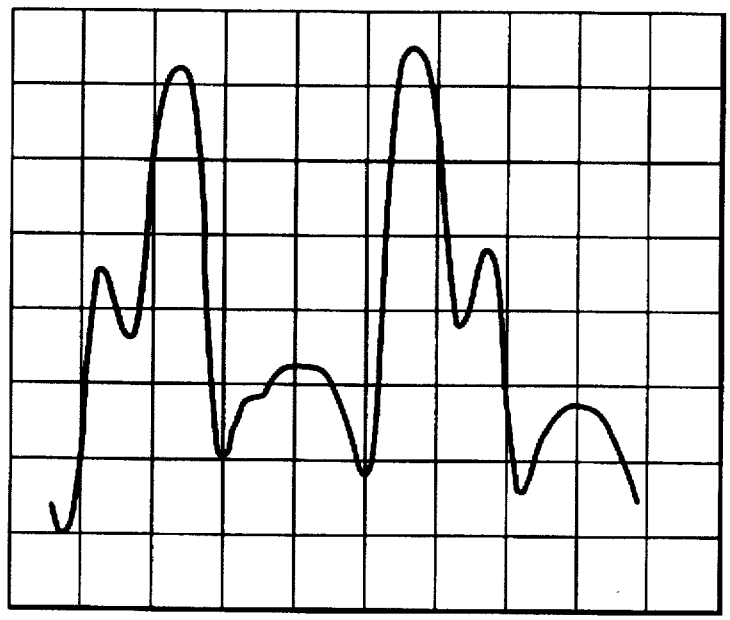
Figure 2S:
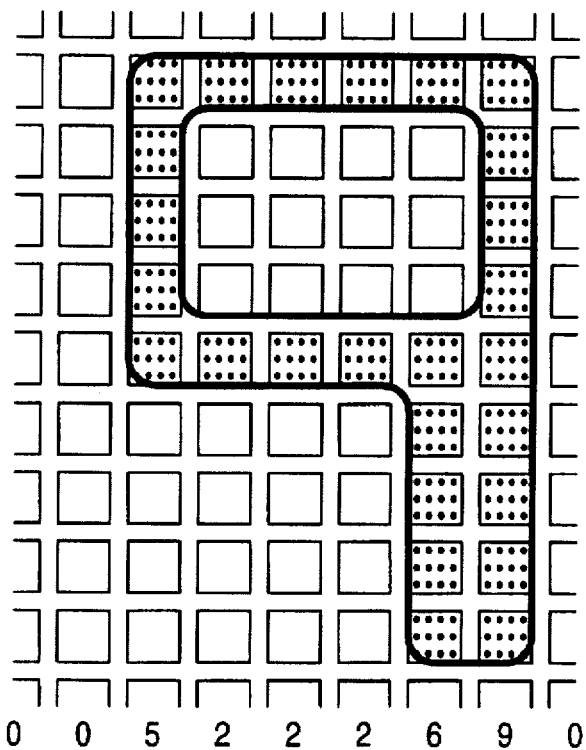
FIGS. 2S and 2T respectively depict the character "9" in the E13B font, superimposed upon cells and showing the idealized corresponding column-sum set, and a corresponding typical magneto-resistive read head output signal.
Figure 2T:
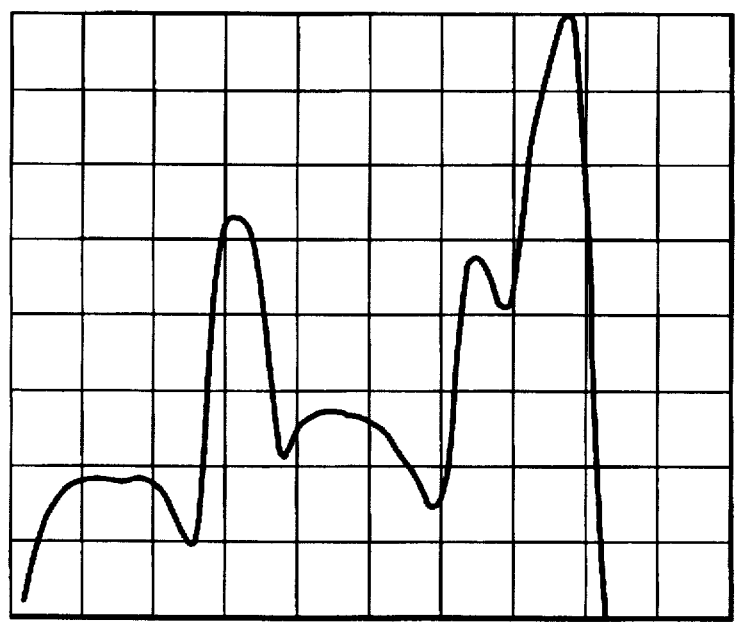
Figure 2U:
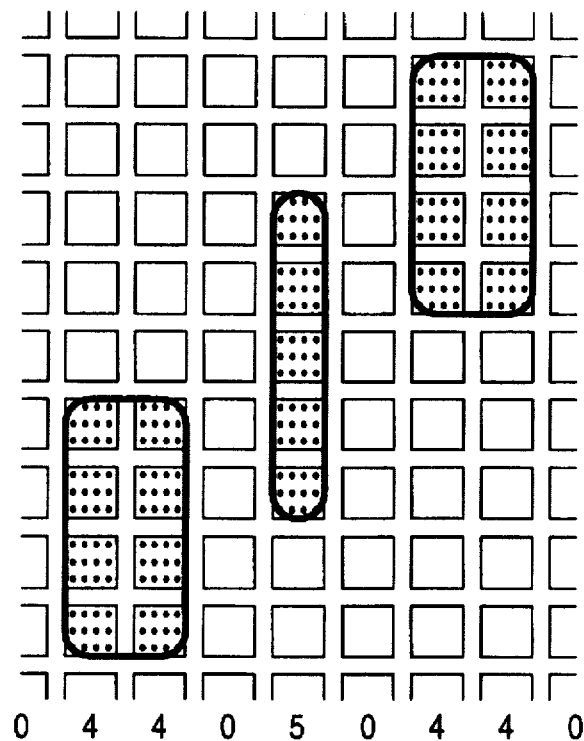
FIGS. 2U and 2V respectively depict the character symbol "Amount" in the E13B font, superimposed upon cells and showing the idealized corresponding column-sum set, and a corresponding typical magneto-resistive read head output signal.
Figure 2V:
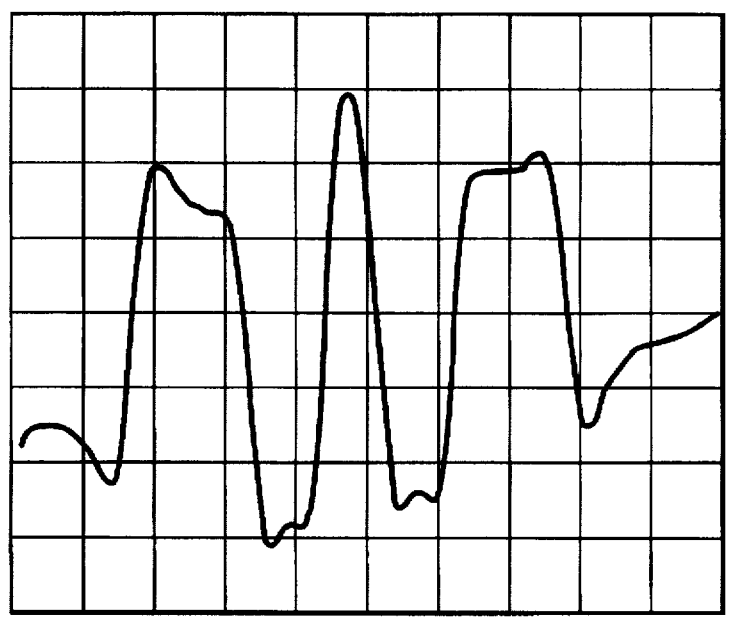
Figure 2W:
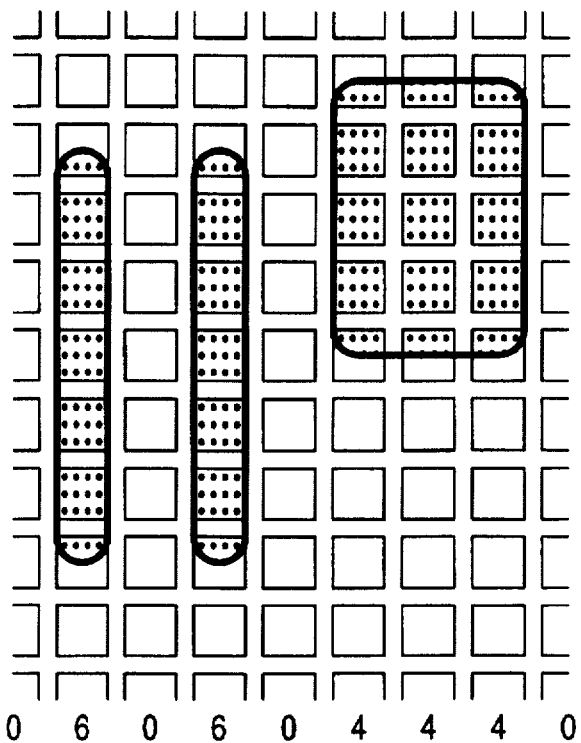
FIGS. 2W and 2X respectively depict the character symbol "On Us" in the E13B font, superimposed upon cells and showing the idealized corresponding column-sum set, and a corresponding typical magneto-resistive read head output signal.
Figure 2X:
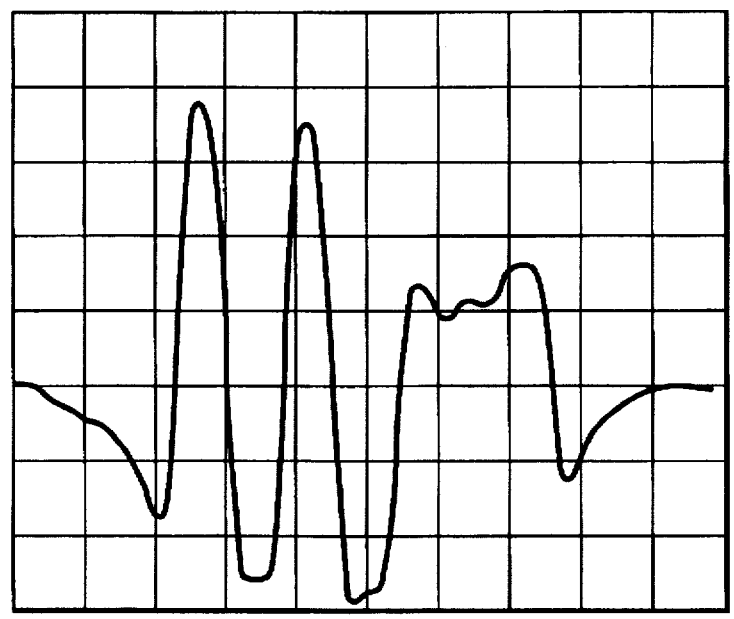
Figure 2Y:
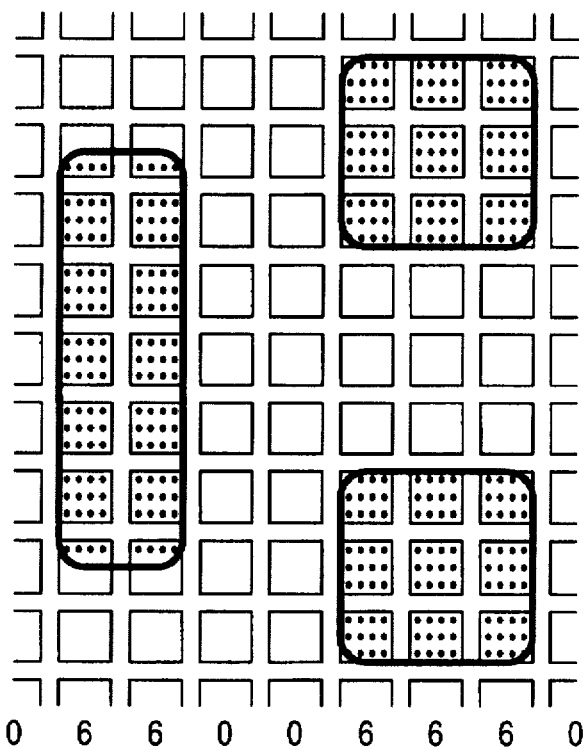
FIGS. 2Y and 2Z respectively depict the character symbol "Transit" in the E13B font, superimposed upon cells and showing the idealized corresponding column-sum set, and a corresponding typical magneto-resistive read head output signal.
Figure 2Z:
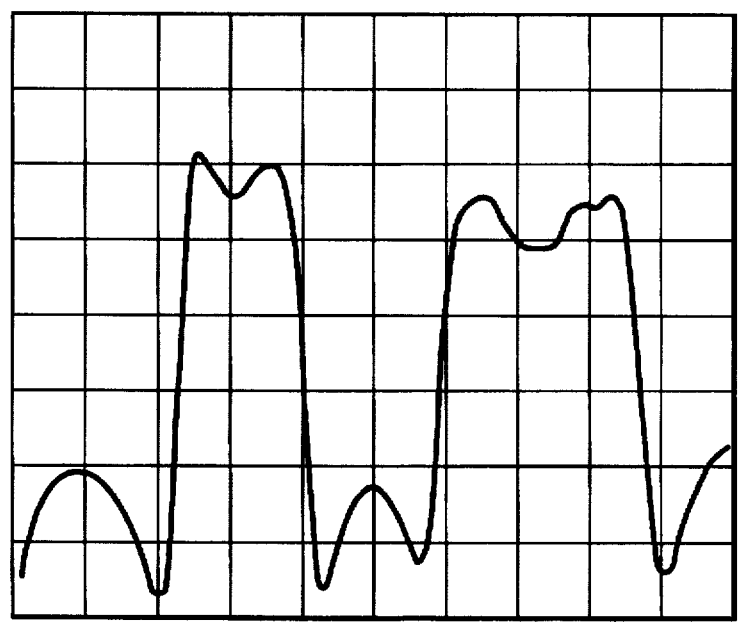
Figure 2A:
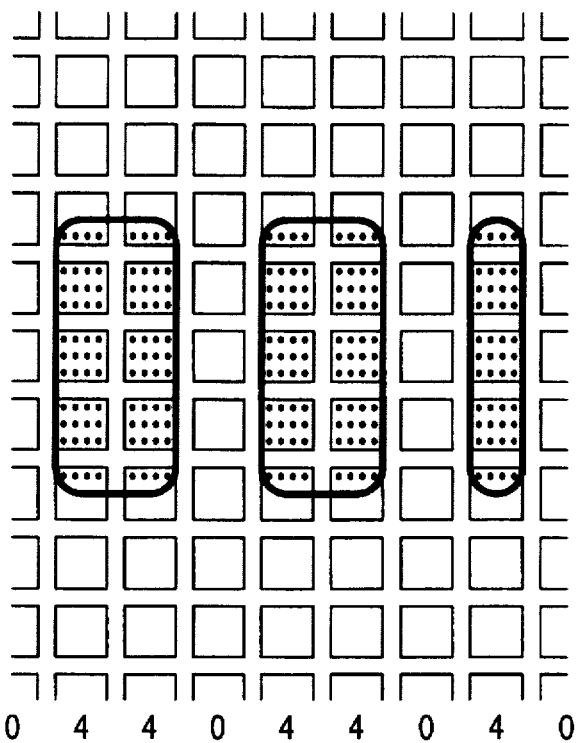
Figure 2B:

FIG. 2C depicts the E13B font character "1" and the corresponding idealized columnar sums (here, 0-4-4-9-6-0-0-0, reading right-to-left). It is seen that the first-used columnar sum will always be a "0", representing the nearest portion of the preceding unlinked interval. Further, eight columnar sums will be examined in identifying each character read. FIG. 2D depicts a typical magneto-resistive read head output signal for the character "1". In similar fashion, FIGS. 2E through 2BB depict characters and/or character symbols, corresponding idealized columnar sums, and the corresponding analog output signal from the magneto-resistive read head.

As document 10 moves relative to read head 50, the start of each character is first sensed by the relatively large increase in signal strength between the nominally zero level preceding the character, and the strength associated with the first inked column. Next, the signal strength from each vertical column is summed (or read), to form a column set of summed signal strengths, $V_1, V_2, \ldots V_M$. For the example of FIG. 2A, when the digit "0" is read, the column set ideally would be "8,2,2,2,2,2,8", reading the columns right-to-left. For the example of FIG. 2C, when the digit "1" is read, the column set ideally would be "0,4,4,9,6,0,0", reading right-to-left. In this column set, the first encountered non-zero strength signal is "4", which is denoted V1.

Because magneto-resistive read heads output a widely varying signal, it is necessary to normalize the column set. However, as noted, magneto-resistive read head output signals generally do not include a reliable base line that would facilitate normalization. Accordingly, the present invention normalizes the M entries within each character's column set by first comparing signal strength from one column ($V_x$) to the signal strength of the preceding column ($V_{x-1}$), and by then quantizing these ratios. Normalizing in this fashion avoids any reliance upon a base line signal strength.

A set of ratios $R_x$ is then formed, where $R=(V_x/V_{x-1})$, and $1 \leq x \leq M$. Because there is empty space (e.g., no ink and thus no magnetic field) before and after each character, $V_0$ and $V_{M+1}$ will each ideally be zero. For the example of FIG. 2A, these ratios $R_x$ are 8/0 (0 being the preceding blank space), 2/8, 2/2, 2/2, 2/2, 2/2, and 8/2. For the example of FIG. 2C, these ratios $R_x$ are 4/0, 4/4, 9/4, 6/9, 0/6, 0/0, and 0/0 (the numerator 0 being the leftmost blank space). Division by zero is handled as a special case, as is the ratio 0/0.

For each character, a set of M ratios $R_x$ is formed. The set of ratios $R_x$ is then quantized into one of three levels, depending upon whether $R_x>T_1$, $R_x<T_2$, or $T_1 \leq R_x \leq T_2$. $T_1$ and $T_2$ represent first and second threshold values and preferably are 4/3 and 3/4 respectively, values found by applicants to produce excellent character recognition. The three quantized levels may be represented by three arbitrary quantization symbols, for example the mnemonically useful symbols "+", "−" and "=" corresponding to "more" "less" and "same", respectively. Using these symbols, if $R_x>4/3$ then $R_x$ is set to "+", if $R_x<3/4$ then $R_x$ is set to "−", and if $3/4 \leq R_x \leq 4/3$ then $R_x$ is set to "=". Of course any other three symbols could be used instead, for example, "$S_1$", "$S_2$", "$S_3$", or "A", "B", "C", etc.

Applicants have discovered that quantizing the column ratio sets $R_x$ into these three levels permits patterns of the quantization symbols (e.g., "+", "−", "=") to uniquely and reliably identify the 14 characters in the E13B character set. TABLE 1 below shows the unique three-character pattern set for each of the 14 E13B characters, according to the present invention.

TABLE 1

| E13B CHARACTER | QUANTIZED CODE PATTERN |
| --- | --- |
| 0 | + − = = = = + |
| 1 | + = + − − = = |
| 2 | + − = + − = = |
| 3 | + + − = = − = |
| 4 | + = − = + = − |
| 5 | + − = = + − = |
| 6 | + − + − = + − |
| 7 | + − + − + − = |
| 8 | + + − = = + − |
| 9 | + − − = = + − |
| Amount | + = − + − + = |
| On Us | + = = − + − + |
| Transit | + = = − = + = |
| Dash | + − + = − + = |

The thus-signal processed character output signal from the magneto-resistive head is then compared with the contents of a look-up table (or the equivalent) containing patterns for the 14 characters in the E13B font. The closest match is then made between the stored patterns and the quantized code patterns resulting from signal processing the magneto-resistive read head output. In this fashion, each character being sensed by the magneto-resistive read head is readily and rapidly identified, without need for a large template algorithm.

As noted, imperfections can result in imperfectly inked characters, or in inked characters are that imperfectly read. For example, a printing error may result in the symbol "0" being printed without one of the left or right columns being fully inked. Thus, with reference to FIG. 2A, assume that the "$V_1$" column contained ink voids and simply was not adequately printed. The resultant "C"-shaped character would still provide a unique quantized code pattern (+,=,= ,=,+,−), and look-up table 170 could also include this pattern, with a correlation to a true "0" recognition. In similar fashion, look-up table 170 could include correlations to other quantized code patterns generated by improperly printed characters.

Still more sophisticated error correction could be provided for recognition of troublesome characters, e.g., those whose quantized code patterns deviate from the expected. Such characters, after first being processed in the normal fashion using first and second threshold levels, could then be re-processed with third and fourth somewhat different threshold levels to obtain a more definitive quantized code pattern. The look-up table could store recognition patterns correlating to quantized code patterns that were obtained using these different threshold levels.

FIG. 3 is a flowchart depicting generation of the E13B character quantized code patterns, according to the present invention. At step 300, the start of a character is recognized by comparing the read head output signal for the uninked space preceding each character with the read head output signal for the first character column containing magnetized ink. As noted, an output signal from the track sensor mechanism 70 enables signal processing system 90 to know when characters 20 should be sensed, and when the analog read head output signal should be sampled.

As document 10 is moved by mechanism 30, the read head 50 outputs signals on a column-by-column basis, and column sums $V_x$ are formed at step 310. The signals $V_x$ are proportional to the amount of ink (e.g., amount of residual magnetism) in the cells comprising each column.

At step 320, the ratio $R_x$ is formed for each of the M columns in the character being read. At decision step 330, $R_x$ is compared to a first threshold level T1, preferably about 4/3. If $R_x > 4/3$, then $R_x$ is quantized and replaced at step 340 by a first symbol, e.g., "+". This first symbol preferably is stored in RAM 140.

However if step 330 ascertains that $R_x \leq 4/3$, the routine branches to step 350 where a decision is made as to whether Rx is less than the a second threshold level $T_2$, preferably about 3/4. If so, at step 360 $R_x$ is quantized and replaced by a second symbol, e.g., "−", which preferably is stored in RAM 140.

But if step 320 determines that $R_x$ is not less than 3/4, then by definition at step 370 it is known that $3/4 \leq R_x \leq 4/3$, and at step 380, $R_x$ is quantized and replaced by a third symbol, 30 e.g., "=" which preferably is stored in RAM 140.

At step 390, the M quantized symbols are retrieved from RAM 140 and formed into a quantized code pattern set for each character read. The quantized code pattern set ideally will be one of the fourteen patterns depicted in Table 1.

At step 400, a pre-stored quantized code pattern set is retrieved from look-up table 170. Look-up table 170 may include more than one set of quantized patterns. For example, one set may include quantized patterns for T1=4/3 and for T2=3/4, another set may include quantized patterns for different values of T1 and T2. At step 410, a template-matching process is carried out to determine which of the fourteen patterns in the look-up table most closely resembles the quantized code pattern of M symbols generated by the character just read. As shown by the phantom lines in FIG. 3, character identification may be iterative. Thus, if the quantized pattern set associated with threshold values T1=4/3 and T2=3/4 does not provide character identification at step 410, steps 330 through 420 may be repeated but with a different set of values for T1 and T2, e.g., T1', T2' and with a stored set of quantized patterns that is associated with the different threshold values T1' and T2'. Correlation between the look-up table patterns and the patterns generated by the character just read permit rapid character identification.

The recognized character information is then coupled, for example via line 420, to the host system 190. It is understood that RAM 140 may be used to store one character at a time, or preferably an entire document worth of characters at one time. Template matching at step 410 may thus be carried out in real time on a character-by-character basis, or may be carried out after an entire document has been read. In either event, once the RAM-stored information has been used, the RAM may be overwritten with new data corresponding to new characters.

A space, or blank character, is a region devoid of magnetic ink for a lateral span equivalent to the pitch of a typical character. Blanks or multiple blanks are detected by having the system determine the space between character start positions. Next, calculations are performed to determine how many blanks, if any, would fit into the space.

The present invention has been described with respect to sensing magnetically inked characters using a magneto-resistive read head. However, it will be appreciated that the invention may also be practiced with a system using optical character recognition, where the presence or absence of ink in each cell in each character is detected. With respect to FIG. 1, such system could substitute for the magneto-resistive read head an optical read head that comprises a matrix of M×N optical sensors. The optical read head output would be a signal substantially identical to the column set of signal strengths described for a magneto-resistive read head. Of course the pre-charge head could also be dispensed with in such an optical character recognition system.

Modifications and variations may be made to the disclosed embodiments without departing from the subject and spirit of the invention as defined by the following claims.

What is claimed is:

1. In a system for sensing ink-printed E13B font characters with a read head responsive to said ink, wherein each of said characters to be read is defined to occupy at least part of a matrix of cells including M columns, a method for recognizing said characters comprising the following steps:

(a) examining a column-sum read head output signal $V_x$ as said read head senses each of said M columns for each of said characters, where $1 \leq x \leq M$, and V1 is a first read non-zero signal strength signal preceded by a zero signal strength signal V0;

(b) for each of said characters, forming a set of M ratios $R_x = V_x/(V_{x-1})$, where $1 \leq x \leq M$;

(c) for each of said characters, quantizing said ratios $R_x$ into one of three values;

(d) based upon said values, forming a set of quantized code patterns that each contain M pattern members and that each permit unique correlation to one of said characters to be read; and (e) recognizing said characters to be read from said quantized code patterns.

2. The method of claim 1, wherein said ink is magnetic ink, and wherein said read head is a magneto-resistive read head.

3. The method of claim 1, wherein said method is carried out electronically.

4. The method of claim 1, wherein at step (c), said three values are $S_1$ when $R_x > T_1$, $S_2$ when $R_x < T_2$, and $S_3$ when $T_2 \leq R_x \leq T_1$, where $T_1$ and $T_2$ are threshold numbers.

5. The method of claim 4, wherein $T_1$ is approximately 4/3, and wherein $T_2$ is approximately 3/4.

6. The method of claim 5, wherein M=7 and at step (e), said quantized code patterns and correlation to said characters to be read is given as follows:

| E13B character: | quantized code patterns: | | | | | | |
|---|---|---|---|---|---|---|---|
| 0 | $S_1$ | $S_2$ | $S_3$ | $S_3$ | $S_3$ | $S_3$ | $S_1$ |
| 1 | $S_1$ | $S_3$ | $S_1$ | $S_2$ | $S_2$ | $S_3$ | $S_3$ |
| 2 | $S_1$ | $S_2$ | $S_3$ | $S_1$ | $S_2$ | $S_3$ | $S_3$ |
| 3 | $S_1$ | $S_1$ | $S_2$ | $S_3$ | $S_3$ | $S_2$ | $S_3$ |
| 4 | $S_1$ | $S_3$ | $S_2$ | $S_3$ | $S_1$ | $S_3$ | $S_2$ |
| 5 | $S_1$ | $S_2$ | $S_3$ | $S_3$ | $S_1$ | $S_2$ | $S_3$ |
| 6 | $S_1$ | $S_2$ | $S_1$ | $S_2$ | $S_3$ | $S_1$ | $S_2$ |
| 7 | $S_1$ | $S_2$ | $S_1$ | $S_2$ | $S_1$ | $S_2$ | $S_3$ |
| 8 | $S_1$ | $S_1$ | $S_2$ | $S_3$ | $S_3$ | $S_1$ | $S_2$ |
| 9 | $S_1$ | $S_2$ | $S_2$ | $S_3$ | $S_3$ | $S_1$ | $S_2$ |
| Amount | $S_1$ | $S_3$ | $S_2$ | $S_1$ | $S_2$ | $S_1$ | $S_3$ |

-continued

| E13B character: | quantized code patterns: | | | | | | |
|---|---|---|---|---|---|---|---|
| On Us | $S_1$ | $S_3$ | $S_3$ | $S_2$ | $S_1$ | $S_2$ | $S_1$ |
| Transit | $S_1$ | $S_3$ | $S_3$ | $S_2$ | $S_3$ | $S_1$ | $S_3$ |
| Dash | $S_1$ | $S_2$ | $S_1$ | $S_3$ | $S_2$ | $S_1$ | $S_3$. |

7. The method of claim 1, where for each said character to be read, step (e) includes electronically comparing said quantized code patterns with an electronically-stored set of patterns representing at least each of said characters in said E13B font.

8. The method of claim 1, wherein step (e) includes comparing a second set of patterns correlating to known patterns of imperfectly inked ones of said characters to be recognized to said set of quantized code patterns.

9. In a system for sensing magnetically-inked E13B font characters with a magneto-resistive read head, each of said characters to be read defined to occupy at least part of a matrix of cells including M columns, a method for recognizing said characters comprising the following steps:

(a) examining a column-sum read head output signal $V_x$ as said read head senses each of said M columns for each of said characters, where $1 \leq x \leq M$, and V1 is a first read non-zero signal strength signal preceded by a zero signal strength signal V0;

(b) for each of said characters, forming a set of M ratios $R_x = V_x/(V_{x-1})$, where $1 \leq x \leq M$;

(c) for each of said characters, quantizing said ratios $R_x$ to $S_1$ when $R_x > T_1$, to $S_2$ when $R_x < T_2$, and to $S_3$ when $T_2 \leq R_x \leq T_1$, where $S_1$, $S_2$ and $S_3$ are values and where $T_1$ and $T_2$ are threshold numbers;

(d) based upon said values, forming a set of quantized code patterns that each contain M pattern members and that each permit unique correlation to one of said characters to be read; and (e) recognizing said characters to be read from said quantized code patterns.

10. The method of claim 9, wherein at step (c), $T_1$ is approximately 4/3, and wherein $T_2$ is approximately 3/4.

11. The method of claim 9, wherein said method is carried out electronically.

12. The method of claim 10, wherein M=7 and at step (d), said quantized code patterns and correlation to said characters to be read is given as follows:

| E13B character: | quantized code patterns: | | | | | | |
|---|---|---|---|---|---|---|---|
| 0 | $S_1$ | $S_2$ | $S_3$ | $S_3$ | $S_3$ | $S_3$ | $S_1$ |
| 1 | $S_1$ | $S_3$ | $S_1$ | $S_2$ | $S_2$ | $S_3$ | $S_3$ |
| 2 | $S_1$ | $S_2$ | $S_3$ | $S_1$ | $S_2$ | $S_3$ | $S_3$ |
| 3 | $S_1$ | $S_1$ | $S_2$ | $S_3$ | $S_3$ | $S_2$ | $S_3$ |
| 4 | $S_1$ | $S_3$ | $S_2$ | $S_3$ | $S_1$ | $S_3$ | $S_2$ |
| 5 | $S_1$ | $S_2$ | $S_3$ | $S_3$ | $S_1$ | $S_2$ | $S_3$ |
| 6 | $S_1$ | $S_2$ | $S_1$ | $S_2$ | $S_3$ | $S_1$ | $S_2$ |
| 7 | $S_1$ | $S_2$ | $S_1$ | $S_2$ | $S_1$ | $S_2$ | $S_3$ |
| 8 | $S_1$ | $S_1$ | $S_2$ | $S_3$ | $S_3$ | $S_1$ | $S_2$ |
| 9 | $S_1$ | $S_2$ | $S_2$ | $S_3$ | $S_3$ | $S_1$ | $S_2$ |
| Amount | $S_1$ | $S_3$ | $S_2$ | $S_1$ | $S_2$ | $S_1$ | $S_3$ |
| On Us | $S_1$ | $S_3$ | $S_3$ | $S_2$ | $S_1$ | $S_2$ | $S_1$ |
| Transit | $S_1$ | $S_3$ | $S_3$ | $S_2$ | $S_3$ | $S_1$ | $S_3$ |
| Dash | $S_1$ | $S_2$ | $S_1$ | $S_3$ | $S_2$ | $S_1$ | $S_3$. |

13. The method of claim 9, where for each said character to be read, step (e) includes electronically comparing said quantized code patterns with an electronically-stored set of patterns representing at least each of said characters in said E13B font.

14. The method of claim 13, wherein step (e) further includes comparing a second set of patterns correlating to known patterns of imperfectly inked ones of said characters to be recognized to said set of quantized code patterns.

15. The method of claim 13, wherein following step (e), if recognition of a said character is not achieved, step (c) is repeated with $T_1'$ replacing $T_1$ and with $T_2'$ replacing $T_2$, and wherein step (e) includes comparing a second set of patterns correlating to known patterns of said characters to be recognized when said threshold numbers are $T_1'$ and $T_2'$.

16. A system for recognizing magnetically-inked E13B font characters sensed with a magneto-resistive read head, each of said characters to be read occupying at least part of a matrix of cells including M columns, comprising:

a first memory for storing a column-sum read head output signal $V_x$ as said read head senses each of said M columns for each of said characters, where $1 \leq x \leq M$, and V1 is a first read non-zero signal strength signal preceded by a zero signal strength signal V0;

a divider that, for each of said characters, forms a set of M ratios $R_x = V_x/(V_{x-1})$, where $1 \leq x \leq M$;

a quantizer that, for each of said characters, quantizes said ratios $R_x$ to $S_1$ when $R_x > T_1$, to $S_2$ when $R_x < T_2$, and to $S_3$ when $T_2 \leq R_x \leq T_1$, where $S_1$, $S_2$ and $S_3$ are values and where $T_1$ and $T_2$ are threshold numbers;

a quantized code pattern generator, coupled to receive said values and to form a set of quantized code patterns that each contain M pattern members and that each permit unique correlation to one of said characters to be read; and electronic means for recognizing said characters to be read from said quantized code patterns.

17. The system of claim 16, wherein $T_1$ is approximately 4/3, and wherein $T_2$ is approximately 3/4.

18. The system of claim 17, wherein M=7 and wherein said quantized code pattern generator provides said quantized code patterns and correlation to said characters to be read as follows:

| E13B character: | quantized code patterns: | | | | | | |
|---|---|---|---|---|---|---|---|
| 0 | $S_1$ | $S_2$ | $S_3$ | $S_3$ | $S_3$ | $S_3$ | $S_1$ |
| 1 | $S_1$ | $S_3$ | $S_1$ | $S_2$ | $S_2$ | $S_3$ | $S_3$ |
| 2 | $S_1$ | $S_2$ | $S_3$ | $S_1$ | $S_2$ | $S_3$ | $S_3$ |
| 3 | $S_1$ | $S_1$ | $S_2$ | $S_3$ | $S_3$ | $S_2$ | $S_3$ |
| 4 | $S_1$ | $S_3$ | $S_2$ | $S_3$ | $S_1$ | $S_3$ | $S_2$ |
| 5 | $S_1$ | $S_2$ | $S_3$ | $S_3$ | $S_1$ | $S_2$ | $S_3$ |
| 6 | $S_1$ | $S_2$ | $S_1$ | $S_2$ | $S_3$ | $S_1$ | $S_2$ |
| 7 | $S_1$ | $S_2$ | $S_1$ | $S_2$ | $S_1$ | $S_2$ | $S_3$ |
| 8 | $S_1$ | $S_1$ | $S_2$ | $S_3$ | $S_3$ | $S_1$ | $S_2$ |
| 9 | $S_1$ | $S_2$ | $S_2$ | $S_3$ | $S_3$ | $S_1$ | $S_2$ |
| Amount | $S_1$ | $S_3$ | $S_2$ | $S_1$ | $S_2$ | $S_1$ | $S_3$ |
| On Us | $S_1$ | $S_3$ | $S_3$ | $S_2$ | $S_1$ | $S_2$ | $S_1$ |
| Transit | $S_1$ | $S_3$ | $S_3$ | $S_2$ | $S_3$ | $S_1$ | $S_3$ |
| Dash | $S_1$ | $S_2$ | $S_1$ | $S_3$ | $S_2$ | $S_1$ | $S_3$. |

19. The system of claim 16, where for each said character to be read, said electronic means for recognizing includes:

a second memory storing a set of patterns representing at least each of said characters in said E13B font; and a comparator that compares said quantized code patterns with said set of patterns stored in said second memory.

20. The system of claim 19, wherein said second memory further stores a second set of patterns correlating to known patterns of imperfectly inked ones of said characters to be recognized.

* * * * *